Patented Dec. 2, 1930

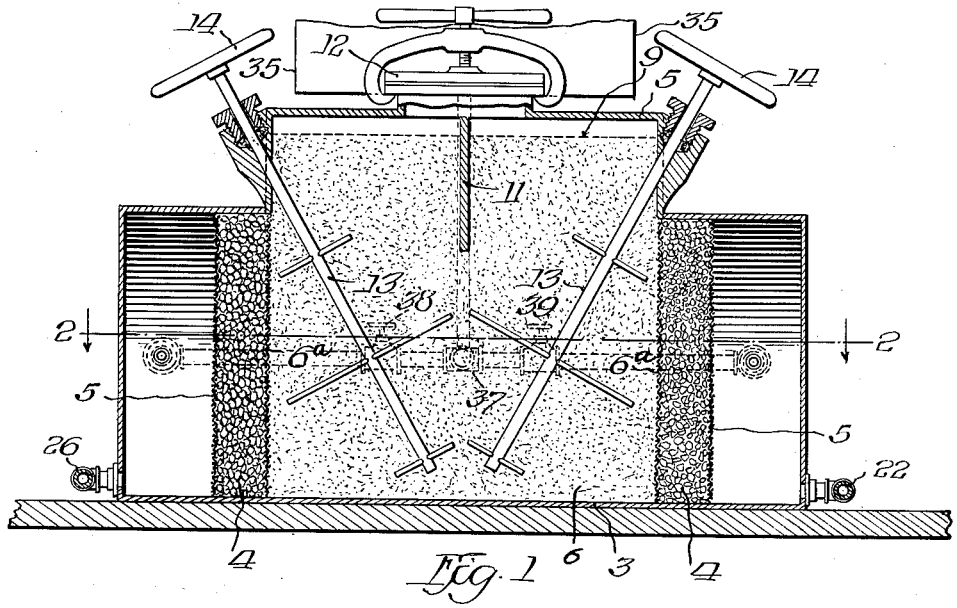
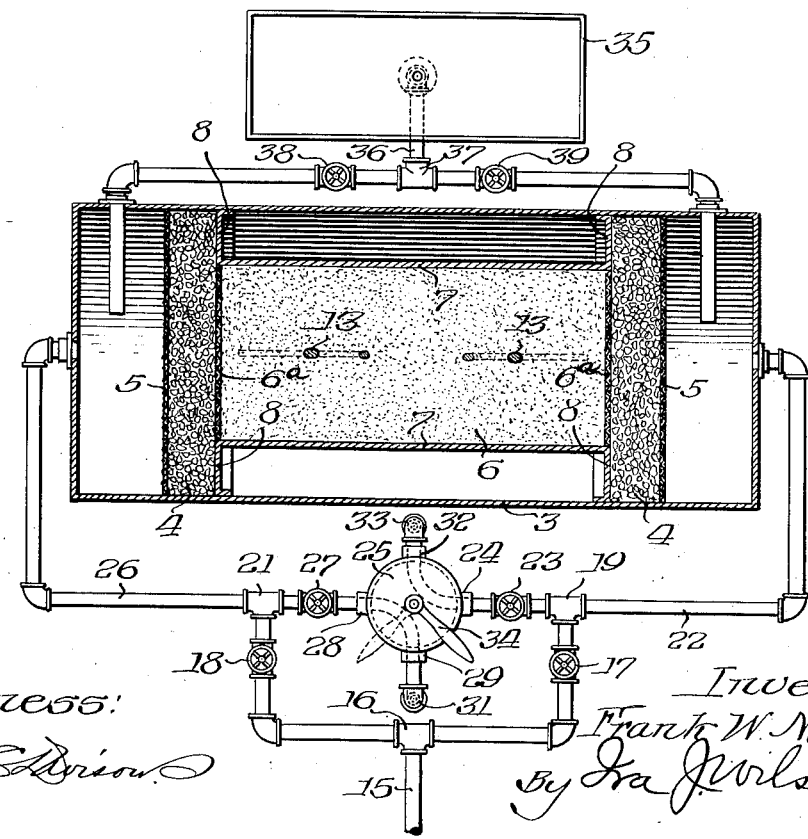

1,783,255

UNITED STATES PATENT OFFICE

FRANK W. MILLER, OF CHICAGO, ILLINOIS, ASSIGNOR OF ONE-HALF TO IRA J. WILSON, OF WINNETKA, ILLINOIS

WATER SOFTENER

Application filed October 4, 1928. Serial No. 310,281.

This invention relates to an apparatus for softening water by a method generally known as a base-exchange process. The softening is accomplished by passing the hard water through a bed of minerals capable of exchanging the base of the materials in the water which render the same hard. The minerals usually used for this purpose are zeolites containing a sodium base or hydrated aluminum silicates.

These apparatuses have been provided with means for regenerating or reviving the minerals in the bed by passing a solution of sodium salt or brine through the bed. This solution through chemical reaction between the sodium salt and the zeolites which have lost their softening properties, for instance, the calcium or magnesium base zeolites, replaces the calcium or magnesium base with sodium permitting the zeolite to be again in the position to exchange its base with the objectionable elements in the water desired to be softened.

The principal object of this invention is to provide an apparatus of the above type which is so constructed that the bed of the base-exchange materials may be revived with more convenience and more efficiency than in the apparatuses heretofore used.

Another object of this invention is to provide a water softening apparatus employing base-exchange materials in which both the flow of water desired to be softened and the flow of the regenerating solution may be reversed as desired.

Other and further objects of this invention will become apparent as the same becomes better understood from an examination of the specification and claims in connection with the accompanying drawings wherein:

Fig. 1 is a vertical sectional view of an apparatus embodying this invention;

Fig. 2 is a horizontal sectional view taken at the line 2—2 of Fig. 1.

Referring to the drawings more particularly:

Numeral 3 represents a rectangularly shaped tank provided with a pair of longitudinally spaced vertical walls 4 of filtering material such as sand or quartz. These walls 4 are each maintained by means of a pair of spaced screens 5 and 6ª so constructed as to maintain therebetween the fine particles of the sand or quartz without permitting the flow of liquid to carry these particles out between interstices of the screens.

The tank 3 is provided with a raised portion 5 between and above the walls 4 to provide a compartment for the base-exchange material 6. Inwardly spaced walls or partitions 7 are provided on either side of the tank 3 between the walls 4 for restricting the width of the compartment for the base-exchange material 6, these partitions being provided at their respective opposite ends with outwardly extending flange portions 8 which sealingly engage said sides so as to prevent water from flowing longitudinally through the tank between the walls 4 except by way of the base-exchange material.

In order that the water or any other liquid desired to flow longitudinally through the tank may not circulate above the material 6 and thus avoid passing through a substantial part thereof the raised portion 5 is provided as shown and the base-exchange material is kept at a level as shown at 9 in Figure 1 which is well above the top of the walls 4 and midway between the ends of the upper wall of the tank there is provided a depending partition 11 which extends downwardly for a considerable distance into the upper surface of said material. The tank 3 is provided with a suitable opening and closure 12 therefor at its top to permit the base-exchange material to be renewed as desired.

Mechanical agitators 13 having handles 14 are provided for stirring up the base-exchange material 6 as desired.

In order that water to be softened may be circulated in either direction horizontally through the tank 3, suitable pipe connections are provided, these connections including a supply pipe 15 for the said water provided with a T-connection 16. The T-connection 16 is connected at its opposite ends through the intermediary of valves 17 and 18 respectively to T-connections 19 and 21 respectively. The T-connection 19 is connected at one of its opposite ends to a pipe 22 leading to one end of the tank 3, the other end of said connection being connected through the intermediary of a valve 23 to one way 24 of a four way valve 25. One of the opposite ends of the T-connection 21 is connected to a pipe 26 leading to the other end of the tank 3 and the other end of the connection 21 is connected through the intermediary of a valve 27 to the opposite way 28 of the four way valve 25. One way 29 of the four way valve 25 is connected to the delivery side of the water line to which the water is delivered after having passed through the tank 3 and after being softened therein. The fourth way 32, of the valve 25, is connected to a brine discharge line 33 the purpose of which will presently be explained.

With the valve 25 in the position shown with its handle 34 to the right, valve 18 closed, valve 27 open, valve 23 closed and the valve 17 open, water desired to be softened will come through the line 15 and the pipe 22 to the right end of the tank 3 where the water passes first through one wall 4 where it is filtered, then through the material 6 where it is softened, and then through the wall 4 to the left end of the tank from which it is delivered to the pipe 26 and through the valve 25 to the water line 31 containing soft water. Should it be desired to reverse the flow of water for an indefinite period, or merely temporarily for instance to remove an accumulation of clogged materials in the right filter wall and/or the bed of base-exchange material 6, the handle 34 may be moved to the dotted line position, the valve 27 closed, the valve 18 opened, the valve 23 opened, and the valve 17 closed, thus reversing the flow of the water through the tank 3 and the filtering walls and base-exchange material therein. It is desirable in reversing the flow of water through the tank 3 that the valve 25 be not switched at once to its new position but be allowed to remain in its old position for a short time allowing the water to be discharged through the pipe 33. The reason for this is that when the water has been flowing for a considerable length of time in one direction through the tank and is suddenly reversed the products which have been filtered out of the water will immediately be dislodged by the reverse flow with the result that the water immediately after reversal will be very dirty. As soon as this dirty water has passed off however, the filter walls and the base-exchange material will have been cleaned and the valve 25 may be switched to its proper position to permit the softened water to be delivered to the pipe 31 instead of the discharge pipe 33.

A brine tank 35 for containing the solution adapted to regenerate the base-exchange material 6 is supported at such a level with respect to the tank 3 that liquid may flow by gravity from the former tank through the latter. A pipe 36 leads from the bottom of the tank 35 to a T-connection 37 the opposite ends of which are connected through the intermediary of valves 38 and 39 respectively to suitable pipes leading to the respective opposite ends of the tank 3. By opening either one of the valves 38 or 39 and closing the other, brine may be caused to flow to either end of the tank 3 to pass through the material 6 in either direction to revive said material. If the brine is desired to flow from left to right through the material 6 valves 38 and 23 are opened, valves 39, 18, 17 and 27 are closed, and the four way valve 25 is adjusted to the full line position shown so as to cause the brine to be discharged through the discharge line 33. If it is desired to cause the solution to flow from right to left through the material 6 the appropriate valves may be operated therefor.

By so constructing the apparatus that the water desired to be softened may flow in either direction through the filter beds or walls and the bed of base-exchange material, such beds may be readily cleaned by reversing the flow therethrough as desired. By permitting the reviving solution to be passed through the base-exchange material in either direction such material may be more thoroughly regenerated.

Other advantages of the aforedescribed apparatus will be apparent without further description, and I am aware that many changes may be made without departing from the principles of this invention and I therefore do not wish to be limited to the details shown or described.

I claim:

1. A water softening apparatus comprising a casing, a pair of longitudinally spaced compartments containing filtering material within the casing, a body of a base-exchange material disposed between said compartments, means for passing water to be softened horizontally through said compartments and body, a space being provided at the top of said body beneath the top of the casing, a partition extending from the top of the casing downwardly through said space a substantial distance into said body disposed transversely across said body, and means for passing a fluid through the body for reconditioning the same.

2. A water softening apparatus comprising a pair of longitudinally spaced apart compartments containing filtering material, a chamber containing base-exchange material disposed between said compartments and extending in the casing higher than the tops of said compartments, a space being provided in said chamber above the top surface of said material, a partition extending downwardly from the top of said chamber through said space into said material and transversely across the line of flow through said chamber, means connected to the casing for circulating regenerating fluid in either direction through said compartments and chamber, and means connected to the casing for circulating hard water in either direction through said compartments and chamber.

3. A water softening apparatus comprising a pair of longitudinally spaced apart compartments containing filtering material, a chamber containing base-exchange material disposed between said compartments and extending in the casing higher than the tops of said compartments, a space being provided in said chamber above the top surface of said material, a partition extending downwardly from the top of said chamber through said space into said material and transversely across the line of flow through said chamber, means extending into said chamber without passing through said compartments for agitating the base exchange material, means connected to the casing for circulating regenerating fluid in either direction through said compartments and chamber, and means connected to the casing for circulating hard water in either direction through said compartments and chamber.

In witness of the foregoing I affix my signature.

FRANK W. MILLER.